United States Patent [19]

Beauvais et al.

[11] 4,294,167
[45] Oct. 13, 1981

[54] METHOD OF APPARATUS FOR CANNING FOOD PRODUCTS

[76] Inventors: Max P. Beauvais, 46 Southridge West, Tiburon, Calif. 94920; Raymond E. Camezon, 623 Tunbridge Rd., Danville, Calif. 94526

[21] Appl. No.: 107,425

[22] Filed: Dec. 26, 1979

[51] Int. Cl.³ ............................................. A47J 27/08
[52] U.S. Cl. ......................................... 99/369; 99/403
[58] Field of Search ................. 99/369, 337, 371, 403, 99/404, 407; 426/407 X; 422/302

[56] References Cited

U.S. PATENT DOCUMENTS

| | | |
|---|---|---|
| 609,856 | 8/1898 | Weck ..................................... 99/369 |
| 676,869 | 6/1901 | Bourdeau . |
| 947,062 | 1/1910 | Hawkins . |
| 1,174,189 | 3/1916 | Smith ..................................... 99/369 |
| 1,524,623 | 1/1925 | Landrum . |
| 1,621,132 | 3/1927 | Reinbold . |
| 2,457,867 | 1/1949 | Chambers . |
| 2,555,230 | 5/1951 | Ford . |
| 3,840,686 | 10/1974 | Hurwitz . |
| 3,875,318 | 4/1975 | Davies . |
| 4,051,972 | 10/1977 | Botkin . |

FOREIGN PATENT DOCUMENTS

| | | | |
|---|---|---|---|
| 79843 | 5/1961 | France ................................. 99/369 |
| 496370 | 7/1954 | Italy ..................................... 99/403 |

Primary Examiner—Harvey C. Hornsby
Assistant Examiner—Arthur O. Henderson
Attorney, Agent, or Firm—Limbach, Limbach & Sutton

[57] ABSTRACT

A method and apparatus for canning food products in a container whose lid is held on by pressure differential between the interior of the container and the outside atmosphere, in which a pressure cover encloses the upper portion of the container and lid and, with the container, forms an enclosed pressure vessel with internal structure urging the container lid against the upper extremity of the container, and pressure control apparatus for limiting the pressure within the pressure vessel, and a base assembly for engaging the pressure cover and the container.

6 Claims, 9 Drawing Figures

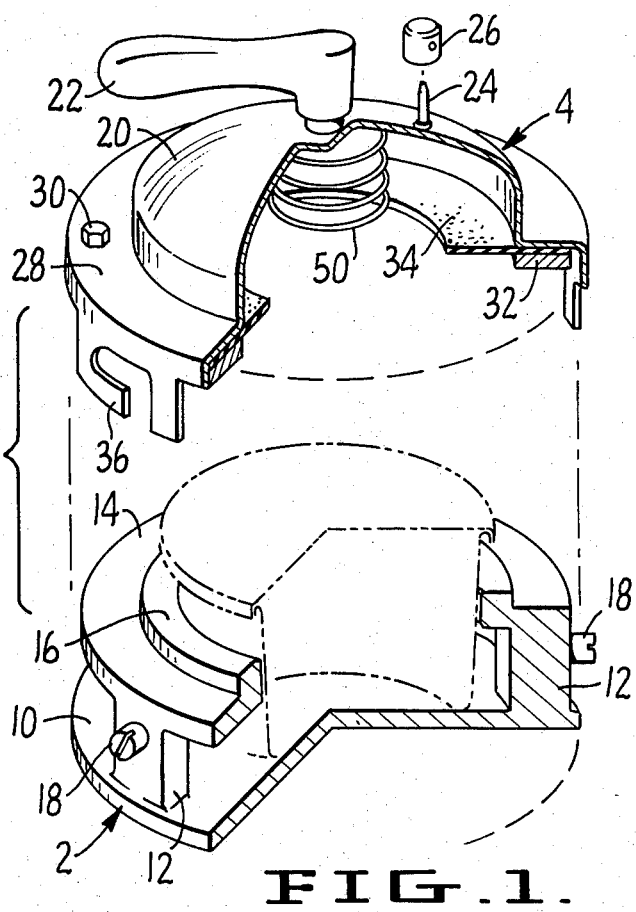
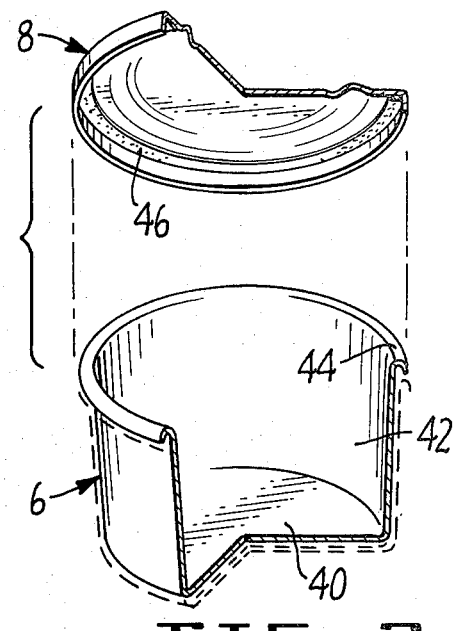
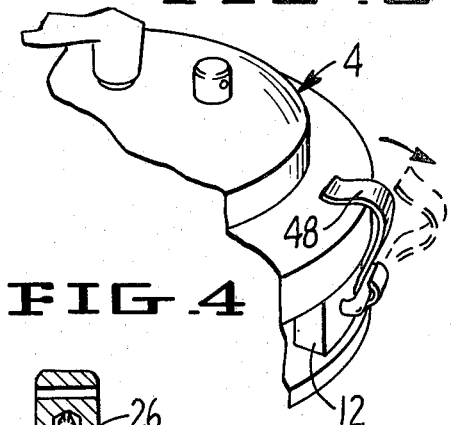
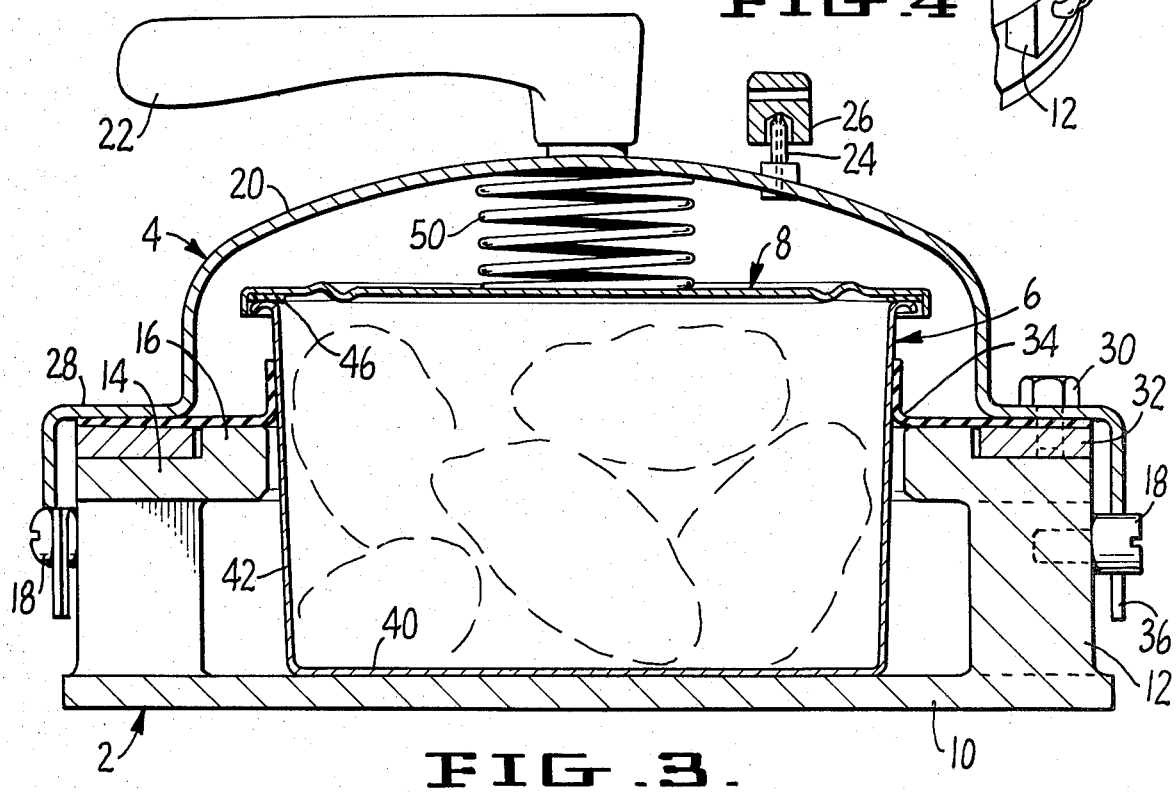

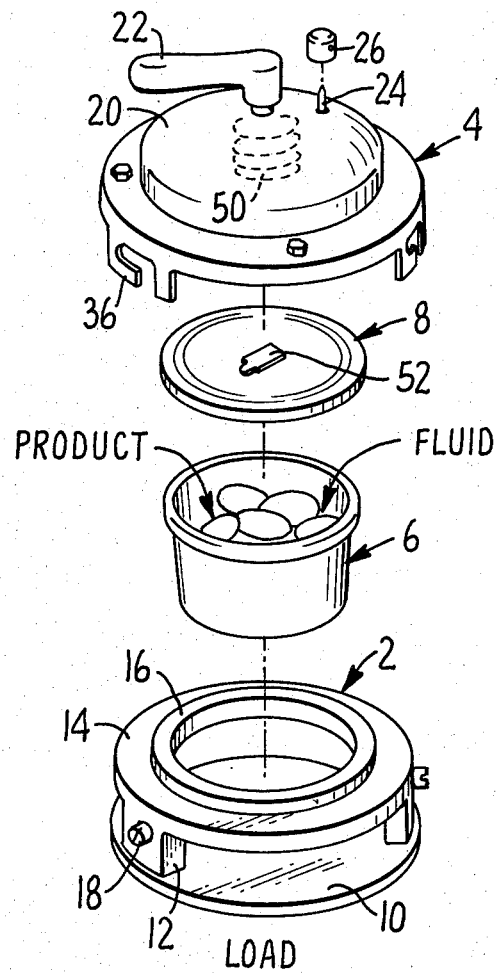
LOAD
FIG. 5.
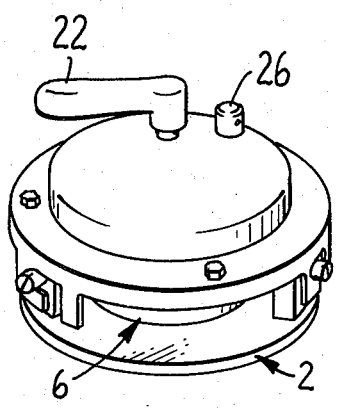
ASSEMBLE & LOCK
FIG. 6.
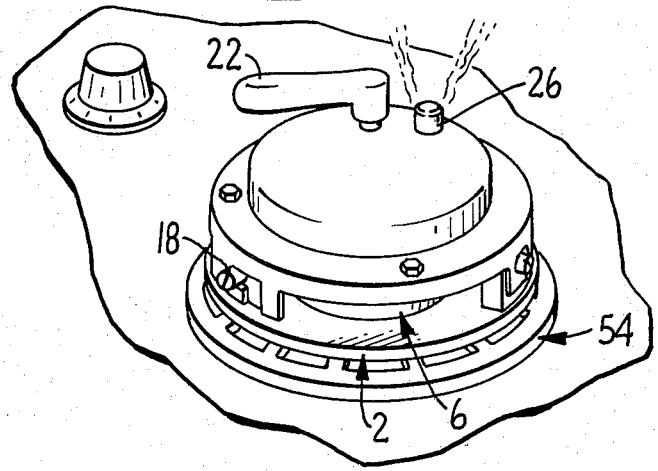
HEAT TO VAPORIZE FLUID, STERILIZE AND VENT AIR
FIG. 7.
COOL TO CONDENSE VAPOR
FIG. 8.
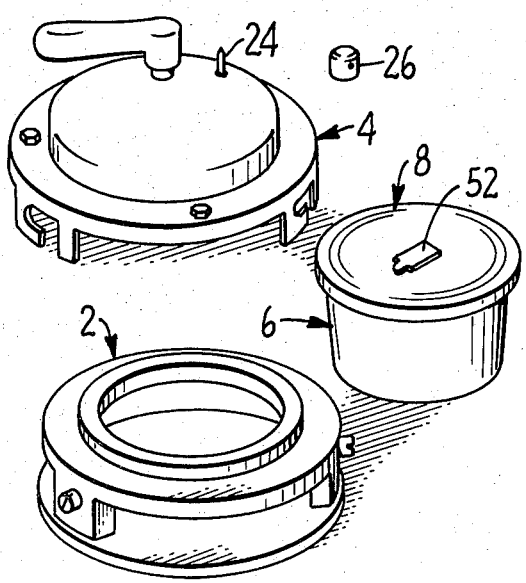
VENT & DISASSEMBLE
FIG. 9.

METHOD OF APPARATUS FOR CANNING FOOD PRODUCTS

BACKGROUND OF THE INVENTION

This invention relates to methods and apparatus for canning food products. More particularly, it relates to methods and apparatus which are suitable for use in home canning operations. Even more particularly, the invention relates to such methods and apparatus which eliminate the need for large enclosed steam retorts.

Home canning of various types of produce, such as fruits and vegetables, has become a popular activity in the United States. While there are many attractive reasons for such home canning, a major disadvantage to the procedure has always been the necessity for pressure cooking the food product within the container. This process has generally involved preparing the food products and placing them in containers, such as glass jars with loosely closed tops, and then placing the container and the product within a pressure cooking vessel, or retort, and then steaming the containers and their contents within the pressure cooker for predetermined periods of time prior to cooling and ultimately removing the containers from the vessel.

The conventional apparatus and method for home canning have suffered from a number of disadvantages, which have discouraged many people from engaging in the home canning process. The disadvantages have included the necessity for expensive and bulky pressure cooking apparatus, as well as the storage of bulky empty jars used therewith. Additionally, the pressure cooking procedure requires substantial time and heating energy to perform, since the entire vessel must be brought up to a temperature sufficient to produce the steam for cooking, and then must be cooled prior to opening. Furthermore, pressure cooking of certain fruits and vegetables in the canning process destroys many desirable characteristics of the food, including crisp textures and retention of vitamins within the fruits and vegetables themselves.

SUMMARY OF THE INVENTION

To overcome the foregoing and other disadvantages of prior art canning methods and apparatus, it is an object of the present invention to provide such methods and apparatus which are fast and simple to use.

It is another object of the invention to provide such method and apparatus which does not require the use of large steam retorts.

It is a further object of the invention to provide such methods and apparatus in which the food product may be sterilized without the texture and vitamin destroying prolonged pressure cooking, and storage with high vacuum without oxygen around 28 inches.

To achieve these and other objects, which will become apparent below, canning apparatus is provided which comprises a container having a removable lid capable of forming an air-tight seal against the open upper extremity of the container, a pressure cover for covering the upper portions of the container and a base assembly. The cover includes pressure sealing structure for forming a pressure tight engagement with the upper portions of the sides of the container, whereby the combination of the pressure cover and the container so covered forms a completely enclosed pressure vessel. The pressure cover also includes means for resiliently urging the container lid downwardly against the upper extremity of the container, and pressure control means for limiting the maximum pressure differential between ambient and the pressure within the combined pressure covering container to a predetermined level. The base assembly includes a base member for positioning and holding the container on a heating unit and conducting heat from the heating unit to the container, and means for releasably engaging the pressure cover and restraining movement of it relative to the base member. A method of sterilizing and canning food products without substantial cooking thereof in a container having a lid covering the open end thereof, and including the steps of placing the food products into the container with a small quantity of liquid sufficient to cover the bottom of the interior of the container, placing a lid having means capable of air-tight sealing over the container open end, enclosing the lid and container open end within a pressure tight cover and resiliently urging the lid against the container open end while permitting steam generated within the container to escape past the lid into the cover, while maintaining lower portions of the container exposed to ambient conditions, applying dry heat to substabtially only the lower portions of the container for a period of time sufficient to sterilize contained food products by the generation of steam from the heating of the liquid, and removing the heat and applying a cooling fluid to the exposed lower portions of the container while maintaining the cover in pressure tight relation with the container open end.

BRIEF DESCRIPTION OF THE DRAWING

One preferred embodiment of the apparatus of this invention will be described in detail in which:

FIG. 1 is a perspective view, partially in section, of the pressure cover and base assembly of the present invention;

FIG. 2 is perspective view, partially in section, of a container and lid for use in the present invention;

FIG. 3 is a side sectional elevation of the combined base, pressure cover and container of FIGS. 1 and 2;

FIG. 4 is a fragmentary perspective view of another embodiment in which the base assembly includes different structure for engaging the pressure cover;

FIGS. 5 through 9 illustrate the apparatus of FIGS. 1 through 3 and the steps of the canning method of the present invention.

DETAILED DESCRIPTION OF A PREFERRED EMBODIMENT

The basic apparatus of the present invention is illustrated in FIGS. 1 through 3 and includes, generally, base assembly 2, pressure cover 4 and container 6 with lid 8. The base assembly 2, suitably fabricated of a metal such as aluminum may be fabricated in any suitable way, but is desirably of a one piece casting. The assembly 2 includes a base member 10 having a plurality of supports 12 extending upwardly therefrom to a cover support ring 14, which engages a cover in a manner to be described below, and which further includes a pressure gasket support ring 16. Projections 18 suitably extend outwardly from each of the upwardly extending supports 12 for engaging the pressure cover in a manner to be described below. These projections 18 may suitably be elements threadedly inserted into supports 12, as illustrated, or may comprise a unitary portion of the supports 12, such as might be formed in a casting process.

Pressure cover 4 may also be formed in any suitable manner, such as spinning aluminum or stainless steel, or from an appropriate aluminum casting. This cover 4 includes dome 20 having a carrying handle 22 of any convenient configuration attached thereto, and has a venting tube 24 which may carry a loosely fitting and weighted pressure regulating cap 26 thereupon. Extending outwardly from the lower edge of the dome 20, and integral therewith, is a skirt 28. Attached to the uderside of the skirt 28, suitably by means of cap screws 30 is ring 32, which may also be metal, with thin, flexible sealing gasket 34 sandwiched between the ring 32 and the underside of skirt 28, as illustrated in FIGS. 1 and 3. This gasket may be of any suitable flexible and heat resistant material, such as silicone rubber.

Extending downwardly from the outer extremities of cover skirt 28 are locking ears 36 which may be moved into releasable engagement with the projections 18 on the base assembly.

A preferred container and its lid are illustrated in FIG. 2, in the form of a can having a low profile, its diameter suitably being equal to or greater than its vertical height. This container, or can, 6, which may be formed of any suitable metal, such as steel with appropriate coatings, preferably has a flat bottom 40 with sides 42 extending generally conically upward therefrom, so that the can has a larger diameter open upper end than the closed lower end. An appropriate lip 44 may be formed at the open upper end of the container 6. The removable lid 8, suitably formed of the same material as container 6, also includes a gasket sealing means 46, suitably of a synthetic rubber-like material, capable of forming an air-tight seal against the lip 44 at the upper extremity of the container 6.

FIG. 4 illustrates structure substantially similar to that of FIGS. 1 through 3, but utilizing a clip 48 pivotally mounted to the upright 12 of the base assembly for releasably engaging and restraining the pressure cover 4. Such a clip arrangement is considered to be substantially equivalent to the cooperation between the locking ears 36 and the projections 18 on the embodiment of FIGS. 1 through 3, but represents a potentially more economical structure for effecting the releasable engagement between the pressure cover 4 and the base assembly 2.

FIG. 3 illustrates the components of FIGS. 1 and 2, assembled together for use. As shown, the container 6 is held upon base member 10, positioned within the gasket support ring 16, with a lid 8 sitting atop the container 6, with its gasket 46 in contact with the upper lip 44 of the container. Pressure cover 4 is shown placed over the upper portion of the container 6 and engaging the base assembly 2, with the cover ears 36 rotated into locking engagement with the base assembly projections 18. As shown, since the inner diameter of the pressure sealing gasket 34 is smaller than the diameter of the container 6, placing this pressure cover 4 over the container causes the inner portion of the resilient gasket 34 to be deformed around the upper portions of the sides of the container, thus forming a pressure tight engagement with the container. Also, bringing the pressure cover into locking engagement with the base assembly compresses the resilient compression spring 50 against the lid 8 of the container, thus resiliently urging that container lid downwardly against the upper extremities of the container.

The foregoing having generally described the apparatus of the present invention, its operation will now be described with respect to the sequential illustrations of FIGS. 5 through 9. FIG. 5 is an exploded view of the components described above with respect to FIGS. 1 through 3. In FIG. 5 are illustrated the base assembly 2, the container 6 with the desired food product, suitably vegetables or fruit to be canned, lid 8 and pressure cover 4. In this embodiment the lid 8 is illustrated also as having a tab 52, suitably of the "pop-top" type which may be used for venting the interior of the container to ambient pressure after processing to relieve the vacuum within, for access to the food products in a manner to be described below. Prior to placing the lid 8 upon the container 6, a small amount of liquid, such as water or juice from the food product, is included within the container, the necessary amount only about that sufficient to cover the bottom of the interior of the container, for example, about one quarter inch depth or so.

The components illustrated in FIG. 5 are assembled together, as previously described with respect to FIG. 3, to form the enclosed structure shown in the perspective view of FIG. 6, in which the pressure cover 4 is locked in place with the base projections 18. This locking thus provides not only for releasable engagement between the base and pressure cover, but also restrains movement of the pressure cover relative to the base. Thus, although the lower portions of the container 6 remain exposed to ambient conditions in the assembly of FIG. 6, the support and positioning of the container 6 by the base assembly 2 and the engagement of the pressure cover 4 with the base assembly and thus its engagement, particularly by the pressure sealing gasket 34, with the upper portions of the container 6, form a pressure-tight combination of the pressure cover and container. As described with respect to FIG. 3, the resilient biasing spring, or means, 50 resiliently urges the lid 8 against the upper extremity of the container 6.

With the container, lid, pressure cover and base assembly all combined as illustrated in FIG. 6, the combined apparatus may then be placed, suitably by means of handle 22, upon an appropriate heating unit 54, which may suitably be the burner of a gas or electric stove. Heat is then applied by this heating unit 54 to the base member 10, which has high thermal conduction and which thus conducts the heat from the heating unit to the lower portions, and particularly the bottom 40, of the container. Sufficient heat is applied to vaporize the small amount of liquid within the container to sterilize the contained food products by the generation of steam. As the steam pressure within the container builds, it may escape from the container and lid into the volume between the container and lid and the pressure cover 4 by forcing the lid 8 upwardly against spring 50 sufficiently to enable both the steam and substantially all contained air to escape between the gasket 46 and the container lip 44.

Vent tube 24, capped by pressure regulating cap 26, similar to that commonly used with conventional pressure cookers, limits the maximum pressure differential between the ambient and the steam pressure within the combined pressure cover and container to a predetermined and well known level which is low enough for safety but sufficient for sterilization of the food products. Any excessive pressure escapes through the tube 24 by lifting the cap 26 out of its engagement with the top of that tube 24. Since the steam from the contained liquid, generated by the heat applied to the lower portions of the container 6, rises through the food products within the container to sterilize them, the entire unit need be left on the burner only long enough to observe steam escaping around the pressure control weight 26 for two or three minutes, this being sufficient to sterilize the food products. This short exposure to heat, which heat is applied only to the lower portions of the container, and the small amount of liquid used in the sterilizing process thus effects sterilization without prolonged pressure cooking of the food product. Particularly where the food product is a vegetable, this permits the vegetable to retain not only the desirable crisp texture of fresh produce, but also facilitates retention of the vitamins which often are cooked off and lost in the cooking liquid.

After the appropriate, brief, sterilizing application of heat to the lower portions of the container, it may be quickly cooled by applying a cooling fluid to the exposed lower portions of the container, unlike conventional canning processes. A simple method of such cooling is illustrated in FIG. 8 in which the entire combined assembly is lifted, as by its handle 22, from the heating unit and placed in a cooling water bath, such as in a kitchen sink, with the water of a sufficient level to surround the lower portions of the container exposed within the base assembly 2. As illustrated, this cooling step is performed with the pressure cover remaining in pressure-tight relation with the container upper end, with the spring 50 urging the lid against the container open upper end. Thus, the cooling of the container by the water bath will condense any steam remaining within the container and thus create a pressure within the container which is substantially lower than ambient, generally on the order of a vacuum of 30 to 40 torr. This cooling will also serve to condense any steam between the combined container and lid and the pressure cover 4. As noted above, the processing has also served to drive substantially all air, and thus oxygen, out of the container, to help preserve the freshness of the food product.

When the entire apparatus has thus been cooled, commonly in a matter of seconds, the pressure regulating cap 26 may be removed from the vent tube 24, thus eliminating the pressure differential between the ambient and the interior of the pressure cover, and the pressure cover may be released from its engagement with the base assembly 2, as illustrated in FIG. 9. By virtue of the substantial pressure differential between the interior of the lidded container 6 and ambient, the lid 8 will be held onto the container in an air-tight seal between the gasket 46 and the upper extremity 44 of the container, the canning process now being completed. Since the lid 8 is retained atop the container 6 only by virtue of the pressure differential, it will be readily apparent, both immediately after canning and at any time when the product is to be used as to whether the seal has remained air-tight to protect the food products within. If the lid is still held tightly onto the container, the seal necessarily has remained air-tight. Conversely, if the lid is loose it is immediately apparent that the seal has failed and the food should either be reprocessed or carefully inspected.

When it is desired to use the canned food products, the lid may be easily removed in either of two ways. If it is desired to heat the food product, the can 6 may simply be set onto a heating element or into boiling water to again increase the pressure within the can to ambient level, whereupon the lid 8 may simply be lifted off. Due to the high vacuum within the container, this heating and its creation of steam within the container may be done very quickly, often in only one or two minutes. In this event the container and lid both may easily be washed and reused for subsequent canning operations. On the other hand, if it is desired not to heat the contents prior to opening, the tab 52 may be lifted, releasing the vacuum within the container and venting the interior of the container to ambient pressure, again permitting simple lifting off of the lid. In this event it may be necessary to replace the lid if the tab 52 is of a single use type, but not if it is of the configuration permitting repeated reuse.

An additional advantage of the apparatus of the preferred embodiment of this invention, in which the container is a can having sides which taper at least slightly inwardly toward the base, is that the containers, when not is use, may readily be nested together to occupy very little space either for shipping or storing, unlike the bulky glass jars commonly used in canning processes.

While the foregoing describes a particularly preferred embodiment of the method and apparatus of the present invention, it is to be recognized that numerous variations and modifications of this apparatus and method, all within the scope of the invention, will readily occur to those skilled in the art. Accordingly, the scope of the invention is to be limited solely by the claims appended hereto and not by the description of the preferred embodiments.

What is claimed is:

1. Apparatus for canning food products, comprising
   a container having a removable lid capable of forming an air-tight seal against the open upper extremity of said container under the influence of a lower than ambient pressure within said container;
   a pressure cover for covering the upper portions of said container and including
      pressure sealing means for forming a pressure-tight engagement with portions of the sides of said container, whereby the combination of the pressure cover and the container so covered forms a completely enclosed pressure vessel;
      means for resiliently urging said container lid downwardly against said upper extremity of said container;
      pressure control means for limiting the maximum pressure differential between ambient and the pressure within said combined pressure cover and container to a predetermined level;
   a base member; and
   means for releasably connecting and restraining movement of said pressure cover relative to said base member, whereby a container and lid enclosing a food product, positioned and held by the base, may be engaged by the pressure cover and its sealing means when heat is applied from a heating unit to the containers, with the cover connected to the base assembly, for limiting pressure within the combined container and cover to the predetermined level to sterilize the food product, with subsequent cooling of the container causing the pressure within the container to be less than ambient to effect an air-tight seal between the lid and the container upper extremity.

2. The apparatus of claim 1 wherein said base member includes areas exposing the lower portions of the sides of said container, below the areas of said engagement by said pressure sealing means, to the environment, whereby cooling of the container after heating may be facilitated by circulation of cooling fluid around the container while the combined pressure cover and container remain closed.

3. The apparatus of claim 1 wherein said base member further comprises support means cooperating with said cover pressure sealing means to support said pressure sealing means against said container and resist deformation of said pressure sealing means.

4. The apparatus of claim 1 wherein said container comprises a metal can.

5. The apparatus of claim 4 wherein said can tapers generally conically from a larger diameter open upper end to a smaller diameter closed lower end.

6. The apparatus of claim 1 wherein said lid includes vacuum releasing means for venting the interior of said container to ambient pressure prior to removal of the lid from sealing engagement with the container.

* * * * *